Oct. 23, 1962    L. ROBBINS ET AL    3,060,351
VOLTAGE RESPONSIVE CONTROL CIRCUIT
Filed Oct. 12, 1959

INVENTORS
LEO ROBBINS
ANTHONY L. LICCARDI

BY
AGENT

United States Patent Office 3,060,351
Patented Oct. 23, 1962

3,060,351
VOLTAGE RESPONSIVE CONTROL CIRCUIT
Leo Robbins, Brooklyn, and Anthony L. Liccardi, Bronx, N.Y., assignors to Baldwin-Lima-Hamilton Corporation, Philadelphia, Pa., a corporation of Pennsylvania
Filed Oct. 12, 1959, Ser. No. 845,787
8 Claims. (Cl. 317—149)

This invention relates to voltage responsive control circuits and in particular to protective switching circuits which are connected to servo systems and respond to the magnitude of the so-called servo error voltage.

Frequently, it is necessary to protectively stop a machine or an electrical system entirely or partially in case of faulty operation. In a servo system, for example, it is desirable that the voltage waveform pattern of the position or follower portion of the servo system accurately correspond to the voltage waveform pattern of the control or command portion of the system. When the instantaneous difference between the two voltages, i.e., the error voltage, is greater than a predetermined maximum, the entire system, or its affected portion, should be shut off. To this end, it is necessary to accurately and reliably detect small changes in the level of the error voltage so as to determine when this error voltage exceeds a predetermined limit.

Circuits as heretofore used for such purposes are complicated, not sensitive enough, or dependent upon critical and difficult adjustments to balance the system.

It is, accordingly, one object of this invention to provide relatively simple circuit means for detecting small changes in voltage level with great accuracy.

A further object of the invention is to provide a voltage responsive control circuit wherein the absolute value of the voltage will exceed a low reference potential only by an extremely small amount for a short period of time.

It is also an object of the invention to provide a voltage responsive control circuit which, though highly sensitive, may be adjusted to varying voltage levels merely by changing the magnitude of a reference voltage.

It is another object of the invention to provide a voltage responsive control circuit which is sensitive to a very small potential but does not require any balancing adjustments.

It is a further object of the invention to provide a protective control circuit which comprises a source of error voltage and a source of reference voltage, and which has a very high input impedance to prevent the reference voltage from affecting the source of error voltage.

It is a still further object of the invention to provide an error detecting circuit for a machine to be controlled, which operates according to the fail-safe principle in that it will stop the machine not only upon detection of a substantial error but also in case of failure of various individual components of the error detecting circuit.

Specifically, it is an object of this invention to provide in a servo system a circuit which will accurately operate a protective relay when the absolute value of an error voltage exceeds a predetermined reference limit by a very small amount which may be in the millivolt range.

The invention also has an object the provision of a protective safety circuit for a servo system or the like, wherein a malfunction relay remains energized when an error signal is below a set reference voltage but is de-energized when the error signal exceeds that voltage.

In a preferred embodiment of the invention, there is provided a protective control circuit which comprises a source of fluctuating potential, a suitable rectifying circuit for obtaining the absolute value of the fluctuating potential, a reference circuit connected in parallel across the output of the rectifying circuit for generating a steady, unidirectional voltage having a frequency differing from that of the fluctuating potential and normally substantially greater in amplitude than the fluctuating potential, and a detector circuit to determine the presence or absence of components of the reference frequency in the resulting voltage. Such voltage components will occur only when the absolute value of the fluctuating potential is smaller than peaks of the reference voltage. The detector responsive to and conditioned by the presence or absence of A.C. components in the resulting voltage is used to operate a control element such as a safety relay.

Various other objects, features and advantages of the invention will become apparent as the description proceeds.

In the drawing which illustrates a preferred embodiment of the invention by way of example, FIG. 1 is a schematic diagram of an electronic circuit according to the invention;

Figure 1:
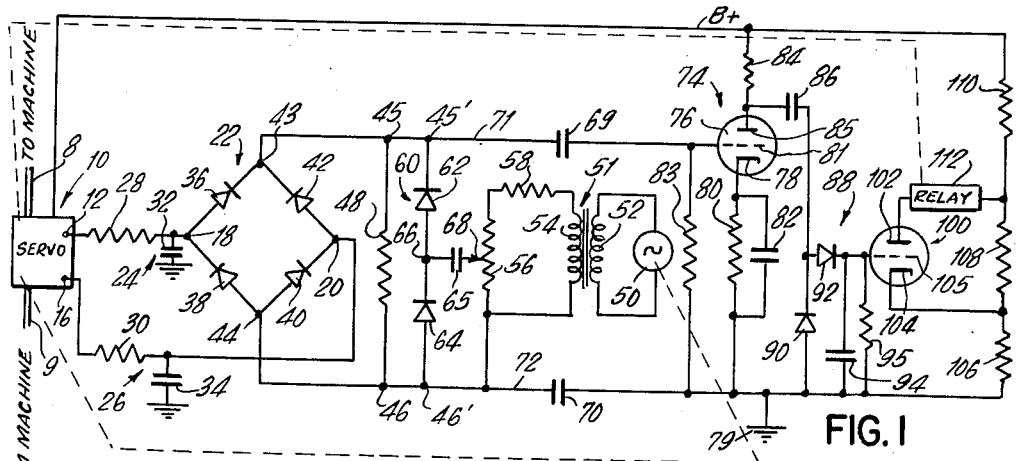

Referring now to FIG. 1, there is illustrated a servo system generally designated 10. This servo system includes means for producing a suitable command signal passing through leads 8 and designed to control the motion of a machine or apparatus in accordance with a selected pattern. The command signal is or may be advantageously represented by a varying voltage having frequency components of one cycle per second or even lower. The motion of the controlled apparatus is intended to correspond to the variations of the command voltage. The inertia of the servo system and the inertia of the controlled apparatus, however, prevent the latter from following the command signal exactly and without delay. In view thereof, a position voltage is developed corresponding to the actual motion of the controlled apparatus, the position voltage being similar to but not identical with the command voltage. The position voltage which is introduced into the servo system by leads 9 serves for comparison with the command voltage, and the difference between the command and the position voltages is referred to as the error voltage. Its magnitude should normally remain within prescribed limits. Preferably, the apparatus is partially or entirely shut down when the error or differential voltage exceeds the prescribed limits and as a corollary it is desirable that the entire apparatus remain in operation when the error signal is within the predetermined limits.

A terminal 12 on servo system 10 is suitably connected to one of the leads 8 so that its voltage is representative of the command signal of desired polarity. Terminal 16 properly polarized with respect to terminal 12 is connected to one of the leads 9 and its voltage is representative of the position signal. The potential from terminal 12 to terminal 16 may then be considered the error voltage. A full wave bridge rectifier circuit generally designated 22 has its input terminals 18 and 20 connected to terminals 12 and 16, respectively, by means of noise filters generally designated 24 and 26. The noise filters comprise series resistors 28 and 30, respectively, and capacitors 32 and 34, respectively, connected to ground. The full wave bridge rectifier circuit 22 includes two pairs of series connected diodes 36, 38, and 40, 42 with polarities as indicated by the diode symbols. If the voltage across terminals 12, 16 is unidirectional, the rectifier circuit 22 will serve to polarize such voltage properly if necessary. Any suitable diodes may be used although germanium semiconductor rectifying diodes are employed in the preferred embodiment illustrated herein. A loading resistor 48, the resistance of which is high, and which is connected across output terminals 43 and 44 of the bridge 22, has terminals designated 45 and 46, the latter having the same potential as terminals 43 and 44.

A stable alternating current source 50 such as a thyratron controlled signal generator is preferably higher in frequency than the highest frequency component of the rectified error signal after extraneous noise has been removed from the latter. In the particular embodiment illustrated the source 50 is a 400 cycle 6.3 volt supply which may be a part of the servo system 10. An isolating transformer generally indicated at 51 is connected to the alternating current source 50 by its primary winding 52 while its secondary winding 54 is connected across a voltage divider including a potentiometer 56 and series resistor 58. An unfiltered voltage doubler 60 includes two diodes 62 and 64, e.g., semiconductor germanium diodes, connected as shown to terminals 45' and 46' and to a clamp capacitor 65 connected from the junction 66 of rectifiers 62 and 64 to a variable center tap 68 on the potentiometer 56.

The terminals 45' and 46' are advantageously connected, by conductors such as indicated at 71, 72 and two blocking capacitors 69 and 70, to a suitably biased amplifier circuit generally designated 74 which includes an amplifier tube 76 having a cathode 78 connected to ground at 79 by means of a cathode resistor 80 and a bypass capacitor 82. Tube 76 is illustrated as a triode although a pentode or the like may be used in its place. The grid 81 of tube 76 is biased to ground potential by means of grid resistor 83. A direct current positive voltage supply, for example, a 300 volt supply, is designated B+ and connected by a load resistor 84 to plate 85 of tube 76. The plate 85 is further electrically secured by a blocking capacitor 86 to the input of a filtered half wave rectifier circuit generally designated 88. Rectifier circuit 88 includes a diode 90 connected for current flow from capacitor 86 to ground during negative impulses, a diode 92 connected for positive current flow away from the capacitor 86, and a filter capacitor 94 connected from the diode or rectifier 92 to ground. A grid resistor 95 shunts capacitor 94. A detector tube 100 which is shown as a triode but may have any suitable configuration is provided with a plate 102, a cathode 104 and a grid 105. Series connected from ground to B+ are three resistors 106, 108 and 110, which form a voltage divider. The cathode 104 is connected to the junction of resistors 106 and 108 while the plate 102 is connected to the junction between resistors 108 and 110 by means of a malfunction relay 112. The characteristics of resistors 106, 108 and 110 are suitably chosen to place a positive potential upon cathode 104 so that the tube 100 is biased near the cut-off of the tube. Relay 112 is operative in conjunction with the servo system 10 to maintain operation of the controlled apparatus when energized but to stop such operation when released.

Figure 2:
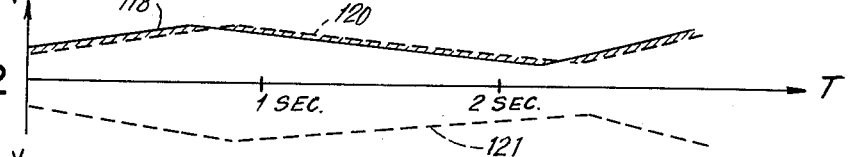
FIG. 2 is an illustration of voltage waveforms of command and position voltages which may occur in the circuit according to FIG. 1.

Operational voltages at the terminals 12, 16 of the servo system 10 are represented in FIG. 2 by a time base voltage illustration of a command voltage 118 (full line) and an associated position voltage 120 (broken line). The command and position voltages 118, 120 are subtracted from each other by connecting like poles thereof to the terminals 12 and 16, respectively, and connecting the other like poles to each other. Curve 121 shows the voltage 120 with a polarity opposite to the polarity of voltage 118 to indicate graphically that a subtraction takes place.

Figure 3:
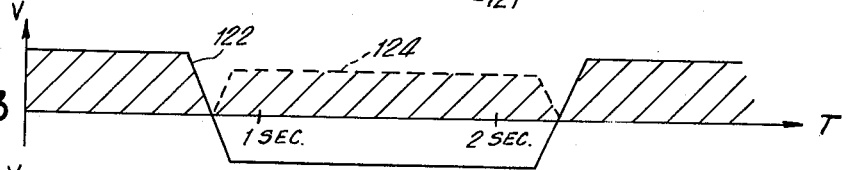
FIG. 3 illustrates voltage waveforms of resulting servo error voltages and the absolute value thereof, the voltages being shown on an enlarged scale.

In FIG. 3, curve 122 illustrates the difference between voltages 118 and 120, i.e., it depicts the error or differential voltage of the servo system 10 measured across terminals 12, 16 or terminals 18, 20, the voltage scale being enlarged for better illustration. It will be clear that the error voltage 122 is fluctuating due to the variations in difference between the command and position voltages 118, 120. Curve 124 (broken line) represents the rectified negative portion of curve 122 after the error voltage has been subjected to full wave rectification in the full wave rectifier 22. The combined positive portions of the curves in FIG. 3 (i.e., above the shading) represent the full wave rectified wave-form as it appears at terminals 43 and 44, thus indicating the absolute value of the error voltage. It should be noted that the amplitudes of the shaded areas between lines 118 and 120 of FIG. 2 are also indicative of the absolute value of the error voltage.

The tap 68 is preset to a predetermined position which, for example, may conveniently produce a potential of .2 volts derived from the 6.3 volt transformer 51. The voltage which would be obtained at the unfiltered output terminals 45' and 46' of the voltage doubler 60 if no other circuit were connected thereto, has the waveform illustrated in FIG. 4 by a curve 128 (broken line, except where coinciding with the resulting voltage) and a maximum amplitude equal to the peak to peak voltage at center tap 68. This is the reference potential to which the rectified absolute value of the error voltage is compared during operation of the servo system 10.

Voltage doubler 60 operates substantially in the customary manner in that the capacitor 65 is charged through the low forward impedance of the diode 64 during negative half cycles, which charge in turn in maintained and added to the voltage during the positive half cycles to produce the waveform indicated at 128. It should be noted that the doubler 60 does not have a condenser across its output and thus is not of the filtered type. Essentially, the negative going signals operate with the diode 64 and capacitor 65 as a voltage clamp for the positive going signals. The waveform 128 is a curve having a peak to peak value equal to the desired maximum limit of the rectified error voltage present at terminals 45, 46.

Figure 4:
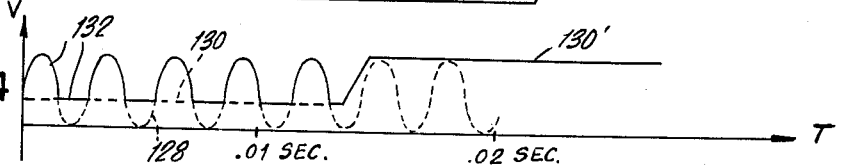
FIG. 4 illustrates voltage waveforms on an extended or large scale time axis at the output of a reference circuit utilized in the invention, and a simplified waveform of the absolute value of error voltage superposed upon the reference waveform.

The error voltage, of course, usually has a rather complex waveshape. For purposes of explanation, however, the voltage across terminals 45 and 46 which is a result of the rectified error voltage may be represented in FIG. 4 by a relatively simple curve 130 (broken line, except where coinciding with the resulting voltage) so that it may be easily combined with the rectified reference voltage represented by the curve 128. The time axis T of FIG. 4 is extended as compared to the time axis in FIG. 3 as will be obvious from the markings along the abscissa. At any instant when the error voltage is smaller than the reference potential at terminals 45' and 46', a back bias exists on the diodes 36, 38, 40 and 42 and the resulting voltage is equal to the instantaneous rectified reference voltage. Similarly, whenever the instantaneous rectified error voltage is greater than the reference voltage, diodes 62 and 64 are back biased and the resulting instantaneous voltage at terminals 45' and 46' is equal to the instantaneous error voltage. Accordingly, the resulting or combined voltage waveform across terminals 45' and 46' will at any instant assume the path of the greater of the two contributing voltages as indicated by the curve 132 (full line) in FIG. 4. This resulting signal 132 is, or may be described as, a fluctuating direct current voltage having a substantial component of 400 cycles and its harmonics. If as indicated at 130' the rectified error voltage reaches the peak to peak value of the clamped voltage 128, the result is a direct current voltage having no 400 cycle component.

It should be noted that, as a consequence of the polarity orientation of the rectifiers described, the error voltage and the 400 cycle source 50 are substantially isolated from each other. The high reverse impedances of the rectifier bridge 22 and the voltage doubler 60 substantially prevent current in one circuit from passage to the other. Thus, the error voltage source and the reference voltage source are not loaded by each other.

Figure 5:
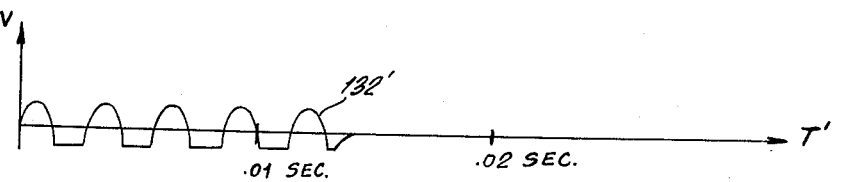
FIG. 5 is a diagram showing the voltage resulting from the combination of voltages in FIG. 4, after passage through blocking capacitors.

The blocking capacitors 69 and 70 remove the direct current component (that is, the area below curve 130 in FIG. 4) from the voltage derived from terminals 45' and 46' and, as shown at 132' in FIG. 5, cause the resulting voltage 132 to alternate relative to an axis T'. The component of 400 cycles indicated in FIG. 5 and its harmonics are passed on to the amplifier 74 for voltage amplification and subsequent rectification by the filtered rectifier 88.

Blocking capacitor 86 connected to plate 85 couples the 400 cycle component of the amplified resulting voltage, shown by curve 132' after amplification, to diode 92 which provides a path for the positive half of cycles to filter capacitor 94. The diode 90 shunts the negative half cycle to ground. Capacitor 94 is sufficient to provide a filtering action with resistor 95 so that the signal upon grid 105 of detector tube 100 will be a substantially positive direct current signal. Thus direct current positive voltage will appear at the grid 105 of tube 100 when A.C. components exist in curves 132 and 132' and no positive signal will appear at grid 105 when no A.C. component exists in these curves.

The resistors 106, 108 and 110 connected from ground to B+ and acting as a voltage divider bias the tube 100 near cutoff by raising the cathode voltage to a positive potential with respect to the grid. The characteristics of the circuit are such that the tube 100 still conducts when only a fraction of the normal 400 cycle signal reaches the grid 98. Any slight increase in error signal beyond this value will further decrease the 400 cycle component and will cause a very steep reduction in plate current to deenergize the relay and thereby stop the apparatus to be protected. Preferably, the relay will remain deenergized until it is reset manually.

Accuracy of the circuit is limited only by the gain of amplifier circuit 74. This gain may be increased by an additional stage to make tube 100 even more sensitive to A.C. components at terminals 45' and 46'.

In summary, the voltages 118 and 120 at terminals 12 and 16, respectively, are subtracted from each other to form an error voltage and rectified by the full wave bridge rectifier 22 to produce a positive going error voltage. This rectified error voltage is a fluctuating positive voltage placed in shunt relation with a positive going half wave rectified reference voltage having a comparatively high frequency of, for example, 400 cycles per second. The voltage derived from terminals 45' and 46' is passed through the remaining portion of the circuit which is suitably designed to detect the presence or absence of alternating current components at terminals 45' and 46', and which will be conditioned in response to such presence or absence. A voltage having alternating current components of but a few millivolts may be amplified to produce a signal sufficient to maintain current flow in the tube 100 which is otherwise biased near cutoff. While the error signal remains below a set value, safety relay 112 is energized and the machine to be protected is operative. A very small increase in the error signal above the reference value will release the relay to partially or entirely stop the machine.

The circuit may readily be adjusted to accurately detect voltages in a wide range simply by changing the reference voltage.

It will be clear that the circuit herein illustrated effectively utilizes the fail-safe principle in that the malfunction relay 112 will be released and the machine stopped if the source 50 fails to supply current or certain components fail to operate properly, for example, the diodes 62, 64, 90, 92 or the tubes 74, 100.

The circuit described may be used, e.g., for controlling a ship motion simulator.

While a specific embodiment has been illustrated in detail, it should be understood that the invention is not limited thereto, and that numerous modifications may be made without departing from the scope of the invention as defined in the appended claims.

What we claim is:

1. In an electric control circuit, a source of unidirectional voltage having a pair of output terminals, an alternating current reference voltage source, means for rectifying said reference voltage having a pair of output terminals and including a diode connected in series between said reference voltage source and one of said last-mentioned output terminals, the output terminals of said first-mentioned source being connected directly to the output terminals of like polarity of said rectifying means to produce a composite waveform, a frequency responsive detector connected to said last-mentioned output terminals for determining the presence of voltage components having the frequency of said reference voltage, and control means operated by said detector, said control means being energized when the presence of voltage components having the frequency of said reference voltage is detected but being deenergized when such voltage components are absent.

2. A protective circuit for a servo system controlling the motion of a machine in accordance with a selected pattern, comprising a source of error voltage proportional to deviation of said motion from said pattern, said source of error voltage having a pair of output terminals, a source of rectified alternating current reference voltage of a predetermined magnitude and frequency having a pair of output terminals, said source of rectified reference voltage including a diode serially connected with one of the latter output terminals, the output terminals of said error voltage source being connected directly to the output terminals of like polarity of said rectified reference voltage source to produce a composite waveform, a frequency responsive detector connected to said latter output terminals for determining the presence of voltage resulting from said reference voltage, and switch means responsive to the condition of said detector and permitting operation of said machine during periods of positive detector reaction but at least partially stopping said operation when the detector reaction is negative due to the error voltage exceeding said predetermined magnitude of the rectified reference voltage.

3. In an electric circuit for operating a control element, a source of fluctuating voltage, means for rectifying said voltage having a pair of output terminals, an alternating current reference voltage source producing a voltage having a frequency differing from the frequency of said fluctuating voltage, means for rectifying said reference voltage having a pair of output terminals and including a unidirectional element connected in series with one of the latter terminals, the output terminals of said first-mentioned rectifying means being connected directly to the output terminals of like polarity of the other of said rectifying means to produce a composite waveform, and frequency responsive detecting means connected to said latter terminals for detecting the presence of voltage components having the frequency of one of said voltages, said control element being operated by said detecting means.

4. A voltage responsive circuit for operating a control element, comprising a source of fluctuating voltage, a full wave rectifier connected to said source and having a pair of output terminals, an alternating current reference voltage source producing a voltage waveform having a frequency greater than the frequency of said fluctuating voltage, unidirectional voltage clamp means for said reference voltage source having a pair of output terminals and including a diode serially connected with one of the latter output terminals, the output terminals of like polarity of said full wave rectifier and said clamp means being directly connected to each other, and means connected to said output terminals and responsive to the frequency of the reference voltage to operate said control element.

5. A voltage responsive control circuit for a system including a source of unidirectional fluctuating voltage, said source having a pair of output terminals; comprising an alternating current reference voltage source for producing a voltage having a frequency greater than the frequency of said fluctuating voltage, an unfiltered half wave voltage doubler rectifier circuit connected to said reference voltage source for producing an alternating unidirectional voltage waveform and having a pair of output terminals, the terminals of said fluctuating voltage source being connected directly to the output terminals of like polarity of said rectifier circuit to produce a composite waveform, an amplifier, blocking capacitor means connecting last-mentioned terminals to said amplifier whereby only voltage components derived from said reference voltage source are amplified, a detector for the output of said amplifier and conditioned by said output, and protective switch means responsive to the condition of said detector.

6. A voltage responsive control circuit comprising a source of fluctuating voltage, a full wave bridge rectifier connected to said source, an alternating current reference voltage source for producing a voltage having a frequency greater than the frequency of said fluctuating voltage, an unfiltered half wave voltage doubler rectifier circuit connected to said reference voltage source for producing a unidirectional voltage waveform, conductor means directly connecting the output terminals of like polarity of said full wave bridge rectifier and said voltage doubler rectifier circuit to produce a composite waveform, an amplifier, blocking capacitor means connecting said conductor means to said amplifier whereby only voltage components derived from said reference voltage source are amplified, a rectifier connected to said amplifier, a detector for the rectified output of said amplifier and conditioned by said output, and protective switch means responsive to the condition of said detector.

7. A protective circuit for a servo system having an error voltage source, comprising a full wave bridge rectifier for said error voltage, an alternating current reference voltage source producing a voltage of a predetermined frequency, an unfiltered half wave voltage doubler rectifier circuit connected to said reference voltage source, a pair of conductors directly connecting the output terminals of like polarity of said bridge rectifier and said voltage doubler rectifier circuit to produce a composite waveform, capacitor means connected to said pair of conductors for passing of alternating current components, an amplifier connected to said capacitor means to amplify said current components, a detector connected to said amplifier and responsive to the existence of alternating current components, and a malfunction relay connected to said detector for energization during periods of detector response and deenergization when the detector reaction is negative due to the absolute value of the rectified error voltage exceeding peak to peak reference voltage.

8. A protective circuit for a servo system having an error voltage source, comprising a full wave bridge rectifier for said error voltage, an alternating current reference voltage source producing a voltage of a predetermined frequency substantially higher than the frequency of said error voltage source, an unfiltered half wave voltage doubler rectifier circuit connected to said reference voltage source, a pair of conductors connecting the output terminals of like polarity of said bridge rectifier and said voltage doubler rectifier circuit to produce a composite waveform, capacitor means connected to said pair of conductors for passing of alternating current components of said predetermined frequency, an amplifier connected to said capacitor means to amplify said current components, a filtered rectifier for the amplified alternating current components, a second amplifier connected to said filtered rectifier and biased near cut-off, said second amplifier being responsive to the unidirectional output of said filtered rectifier so as to be conductive when receiving rectified alternating current components therefrom but non-conductive in the absence of such components, and a malfunction relay connected to said second amplifier for energization during periods of conduction of the second amplifier and for denergization when said second amplifier is non-conductive.

References Cited in the file of this patent

UNITED STATES PATENTS

| | | |
|---|---|---|
| 2,469,860 | Cockrell | May 10, 1949 |
| 2,551,357 | White | May 1, 1951 |
| 2,585,589 | Rockafellow | Feb. 12, 1952 |
| 2,683,214 | Henquet et al. | July 6, 1954 |